(12) United States Patent
Zhang et al.

(10) Patent No.: US 12,543,147 B2
(45) Date of Patent: Feb. 3, 2026

(54) METHOD AND APPARATUS FOR PAGING DEDICATED FOR DEVICES WITH REDUCED CAPABILITIES

(71) Applicant: Lenovo (Beijing) Ltd., Beijing (CN)

(72) Inventors: Yuantao Zhang, Dongcheng District (CN); Yingying Li, Haidian District (CN); Hongmei Liu, Changping District (CN); Zhi Yan, Xicheng District (CN); Ran Yue, Haidian District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 560 days.

(21) Appl. No.: 18/004,081

(22) PCT Filed: Jul. 3, 2020

(86) PCT No.: PCT/CN2020/100225
§ 371 (c)(1),
(2) Date: Jan. 3, 2023

(87) PCT Pub. No.: WO2022/000489
PCT Pub. Date: Jan. 6, 2022

(65) Prior Publication Data
US 2023/0300786 A1    Sep. 21, 2023

(51) Int. Cl.
*H04W 68/00* (2009.01)
*H04L 5/00* (2006.01)
(Continued)

(52) U.S. Cl.
CPC ......... *H04W 68/005* (2013.01); *H04L 5/0096* (2013.01); *H04W 72/0457* (2023.01); *H04W 72/232* (2023.01); *H04W 72/51* (2023.01)

(58) Field of Classification Search
CPC .............. H04W 68/005; H04W 72/51; H04W 72/0457; H04W 72/232; H04L 5/0096
See application file for complete search history.

(56) References Cited

U.S. PATENT DOCUMENTS

| | | | |
|---|---|---|---|
| 2018/0343645 A1 | 11/2018 | Papasakellariou et al. | |
| 2021/0329718 A1* | 10/2021 | Hu | ........................ H04W 72/23 |

(Continued)

FOREIGN PATENT DOCUMENTS

| | | |
|---|---|---|
| CN | 101742411 A | 6/2010 |
| CN | 107852292 A | 3/2018 |

OTHER PUBLICATIONS

OPPO, "Discussion on UE complexity reduction", 3GPP TSG RAN WG1 #101, R1-2004104, e-Meeting [retrieved Dec. 27, 2022]. Retrieved from the Internet <https://www.3gpp.org/ftp/tsg_ran/WG1_RL1/TSGR1_101-e/Docs>., Jun. 2020, 6 Pages.
(Continued)

*Primary Examiner* — Curtis B Odom
(74) *Attorney, Agent, or Firm* — FIG. 1 Patents

(57) ABSTRACT

Embodiments of the present application are directed to a method and apparatus for paging dedicated for devices with reduced capabilities. The method may include: receiving a DCI identified with a P-RNTI in a PO; and obtaining information dedicated for a device with reduced capabilities according to the DCI.

20 Claims, 6 Drawing Sheets

(51) Int. Cl.
*H04W 72/0457* (2023.01)
*H04W 72/232* (2023.01)
*H04W 72/51* (2023.01)

(56) References Cited

U.S. PATENT DOCUMENTS

2022/0394664 A1* 12/2022 Xie .................... H04W 68/005
2024/0008050 A1* 1/2024 Zhou .................. H04W 72/231

OTHER PUBLICATIONS

PCT/CN2020/100225, "International Preliminary Report on Patentability", PCT Application No. PCT/CN2020/100225, Jan. 12, 2023, 5 pages.
PCT/CN2020/100225, "International Search Report and Written Opinion", PCT Application No. PCT/CN2020/100225, Apr. 1, 2021, 6 pages.

* cited by examiner

METHOD AND APPARATUS FOR PAGING DEDICATED FOR DEVICES WITH REDUCED CAPABILITIES

TECHNICAL FIELD

The present application generally relates to wireless communication technology, and especially to a method and apparatus for paging dedicated for devices with reduced capabilities.

BACKGROUND

In a wireless communication procedure, paging allows the network to reach user equipment (UEs) in RRC_IDLE and in RRC_INACTIVE state through paging messages, and to notify UEs in RRC_IDLE, RRC_INACTIVE and RRC_CONNECTED state of system information modification and earthquake and tsunami warning system (ETWS) or commercial mobile alert system (CMAS) indications through short messages.

In 3GPP new radio (NR) scenario, a reduced capability NR device is introduced. The reduced capability NR device may also be referred to as a device with reduced capabilities or a RedCap UE. The RedCap UE may serve the use cases such as industrial wireless sensors, video surveillances and wearables. Compared with legacy enhanced mobile broadband (eMBB) and ultra-reliable and low latency communications (URLLC) UEs (also called legacy UEs or legacy devices in the present application), the RedCap UE requires lower data rates, lower reliability requirements (for most of the use cases), higher latency (for most of the use cases) and long batter life.

Therefore, how to perform paging dedicated for the RedCap UE needs to be considered.

SUMMARY OF THE APPLICATION

Embodiments of the present application provide a method and apparatus for paging dedicated for devices with reduced capabilities.

An embodiment of the present application provides a method. The method may include: receiving a downlink control information (DCI) identified with a paging-radio network temporary identifier (P-RNTI) in a paging occasion (PO); and obtaining information dedicated for a device with reduced capabilities according to the DCI.

In an embodiment of the present application, the information dedicated for the device with reduced capabilities comprises at least one of: a short message indicator dedicated for the device with reduced capabilities; a short message dedicated for the device with reduced capabilities; scheduling information for a paging message dedicated for the device with reduced capabilities; a paging message dedicated for the device with reduced capabilities.

In an embodiment of the present application, the short message indicator dedicated for the device with reduced capabilities may include one of indication information: only scheduling information for paging dedicated for device with reduced capabilities is present in the DCI, only short message dedicated for device with reduced capabilities is present in the DCI, and both scheduling information for paging and short message dedicated for device with reduced capabilities are present in the DCI. The short message indicator dedicated for the device with reduced capabilities is indicated using reserved bits in the short message indicator for legacy devices.

In an embodiment of the present application, the short message dedicated for the device with reduced capabilities may include at least one of: indication information on system information modification for the device with reduced capabilities; and indication information on stop paging monitoring for the device with reduced capabilities. The short message dedicated for the device with reduced capabilities is indicated using reserved bits in the short message for legacy devices.

In an embodiment of the present application, the system information modification for the device with reduced capabilities may include activation or deactivation of configurations dedicated for device with reduced capabilities.

In an embodiment of the present application, the system information modification for the device with reduced capabilities may include: initial bandwidth part (IBWP) configuration update for the device with reduced capabilities.

In an embodiment of the present application, the method may further include: receiving the paging message to obtain the IBWP configuration update for the device with reduced capabilities according to the scheduling information for the paging message.

In an embodiment of the present application, the DCI is a scheduling DCI for the short message and the paging message dedicated for the device with reduced capabilities, which is addressed by P-RNTI that is dedicated for the device with reduced capabilities. The P-RNTI is predefined or configured in SIB1.

In an embodiment of the present application, the method may further include: receiving SIB1 to obtain the system information modification for the device with reduced capabilities.

In an embodiment of the present application, the method may further include: receiving the paging message dedicated for the device with reduced capabilities according to the scheduling information in the scheduling DCI with the P-RNTI dedicated for the device with reduced capabilities. The paging message dedicated for the device with reduced capabilities may include system information modification for the device with reduced capabilities. The system information modification comprises: information on enabling, disabling, or updating of IBWP dedicated for the device with reduced capabilities in system information block. In another example, the system information modification comprises: information on enabling, disabling, or updating of synchronization signal block (SSB) configurations dedicated for the device with reduced capabilities.

In an embodiment of the present application, the method may further include: receiving an update of a common part of IBWP configuration in a device specific signaling.

In an embodiment of the present application, the method may further include: receiving an update of SSB configuration in a device specific signaling.

In an embodiment of the present application, the method may further include: selecting one IBWP from a plurality of IBWPs based on at least one of a device type and a device ID.

In an embodiment of the present application, the PO is dedicated for the device with reduced capabilities.

In an embodiment of the present application, the method may further include: receiving a configuration indicating an IBWP dedicated for the device with reduced capabilities; and switching to the IBWP dedicated for the device with reduced capabilities.

In an embodiment of the present application, the switching to the IBWP dedicated for the device with reduced capabilities comprises: switching to the IBWP dedicated for the device with reduced capabilities when a timer expires.

In an embodiment of the present application, the method may further include: starting a timer when the device with reduced capabilities is on the IBWP dedicated for the device with reduced capabilities; and switching to a second IBWP when the timer expires.

In an embodiment of the present application, the method may further include: receiving the common part of IBWP in a device specific signaling.

Another embodiment of the present application provides a method. The method may include: transmitting a DCI identified with a P-RNTI in a PO, wherein the DCI may include information associated with information dedicated for a device with reduced capabilities.

In an embodiment of the present application, the method may further include: transmitting paging message dedicated for the device with reduced capabilities according to scheduling information in scheduling DCI with the P-RNTI dedicated for the device with reduced capabilities. The paging message dedicated for the device with reduced capabilities may include system information modification for the device with reduced capabilities.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can provide a method for paging dedicated for devices with reduced capabilities and realize initial BWP switching for devices with reduced capabilities.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
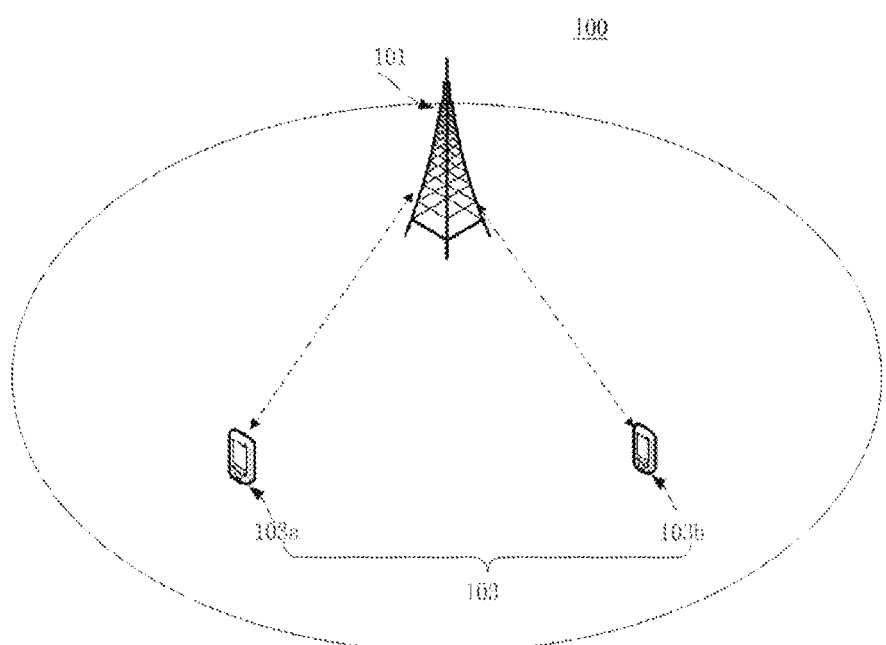
FIG. 1 illustrates a wireless communication system according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and two UEs 103 (e.g., UE 103*a* and UE 103*b*) are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs 102. In some embodiments of the present application, each BS 102 may also be referred to as an access point, an access terminal, a base, a macro cell, a Node-B, an evolved Node B (eNB), a gNB, a Home Node-B, a relay node, a device, or described using other terminology used in the art.

The UE 103*a* may be a normal UE (or regular UE) compatible with existing technology. The UE 103*a* may be a legacy UE (or called legacy device), for example, a legacy eMBB UE or a legacy URLLC UE. For example, the UE 103*a* may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103*a* may be a portable wireless communication device, a smart phone, a cellular telephone, a flip phone, a device having a subscriber identity module, a personal computer, a selective call receiver, or any other device that is capable of sending and receiving communication signals on a wireless network. Moreover, the UE 103*a* may be referred to as a subscriber unit, a mobile, a mobile station, a user, a terminal, a mobile terminal, a wireless terminal, a fixed terminal, a subscriber station, a user terminal, or a device, or described using other terminology used in the art.

The UE 103*b* may be a RedCap UE. Compared with legacy eMBB and URLLC UEs, the RedCap UE 103*b* requires lower data rates, lower reliability requirements, higher latency and long batter life, etc. For example, the UE 103*b* may be an industrial wireless sensor, a smart wearable, a video surveillance, or other devices with the characteristics of RedCap UE. The complexity reduction features of the RedCap UE 103*b* may include: reduced number of UE transmitting or receiving antennas, UE bandwidth reduction, half-duplex-frequency division duplex, relaxed UE processing time, relaxed UE processing capability, or the like.

Figure 2:
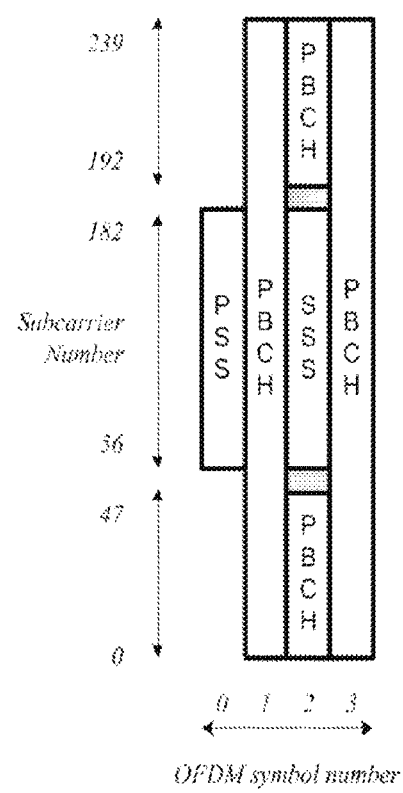
FIG. 2 illustrates a structure of an SSB according to some embodiments of the present application

The BS 101 may transmit synchronization information to the UE 103*a* and UE 103*b* for initial accesses of the UE 103*a* and UE 103*b* to the BS 101. The synchronization information may include one or more synchronization signal blocks (SSBs) as shown in FIG. 2. Each SSB may be associated with a beam transmitted from the BS 101.

FIG. 2 illustrates a structure of an SSB according to some embodiments of the present application.

As shown in FIG. 2, an SSB occupies 4 orthogonal frequency division multiplexing (OFDM) symbols (such as number 0, 1, 2, and 3 on the horizontal axis represent the OFDM symbol) in time domain and 20 resource blocks (RBs) in frequency domain (such as, number 0-47, 56-182, 192-239 on the vertical axis represent subcarrier number).

Referring to FIG. 2, the SSB may include a primary synchronization signal (PSS), a secondary synchronization signal (SSS), and a signal transmitted on the physical broadcast channel (PBCH). The signal transmitted on the PBCH may include master information block (MIB) information. The MIB information may include configuration information for a control resource set (CORESET) (e.g., CORESET #0) for initial accesses of the UEs 103. The CORESET #0 may indicate the frequency resource on which system information block1 (SIB1) information is transmitted.

For NR, a wideband carrier may be divided into one or more subbands. Each subband may be referred to as a "bandwidth part (BWP)". NR defines initial BWP, which is used for scheduling and transmitting common channels such as system information blocks (SIBs), random access signals (msg1, msg2, msg3, or msg4), and paging signals. The BS (e.g., BS 101 in FIG. 1) may configure the common part of initial BWP, which is necessary for the common channel transmission. Optionally, the BS may also configure the dedicated part of initial BWP for efficient UE specific data packet transmission in the initial BWP.

The initial BWP contains initial downlink (DL) BWP and initial uplink (UL) BWP. The common part of initial DL BWP is defined by the span of the CORESET #0 by default and may also be configured or updated in SIB1. The dedicated part of initial DL BWP and initial UL BWP, if configured, are through UE specific radio resource control (RRC) signaling. For the active BWPs other than the initial BWP, both the common part and the dedicated part of the active BWP are configured by UE specific signaling, such as a UE specific RRC signaling.

In order to obtain initial DL BWP, when a UE is power on to access the network or when the UE in an RRC_IDLE state is going to switch to RRC_CONNECTED state, the UE needs to detect the SSB, obtains the COERSET #0 configuration from MIB information in the detected SSB, and thus determines the common part of initial DL BWP defined by CORESET #0. Furthermore, as discussed above, the configuration of the common part of initial DL BWP may be configured or updated in the SIB1. The SIB1 is scheduled by downlink control information (DCI) that is transmitted in CORESET #0, and the SIB1 is transmitted in the scheduled frequency resources within the initial DL BWP. Accordingly, the configuration of the common part of initial DL BWP may also be obtained from the SIB1.

In NR, paging allows the network to reach UEs in RRC_IDLE and in RRC_INACTIVE state through paging messages, and to notify UEs in RRC_IDLE, RRC_INACTIVE and RRC_CONNECTED state of system information modification and ETWS or CMAS indications through short messages.

Both paging messages and short messages are addressed by a DCI format 1_0 identified with a paging-radio network temporary identifier (P-RNTI) on physical downlink control channel (PDCCH). The DCI may include a short message indicator, a short message and scheduling information for paging message if configured. The short message indictor and the short message are defined in Table 1 and Table 2, respectively.

TABLE 1

| Bit | Short Message indicator |
|---|---|
| 00 | Reserved |
| 01 | Only scheduling information for Paging is present in the DCI |
| 10 | Only Short Message is present in the DCI |
| 11 | Both scheduling information for Paging and Short Message are present in the DCI |

The UE may interpret the bit field of the DCI for short message indicator as follows:
  If only scheduling information for Paging is present in the short message indicator (bit 01), the bit field for short message is reserved.
  If only short message is present in the short message indicator (bit 10), the bit field for scheduling information for Paging is reserved.
  If both scheduling information for Paging and short message are presented in the short message indicator (bit 11), all the information in the DCI is effective.

TABLE 2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for Paging in this PO. |
| 5-8 | Not used in this release of the specification, and shall be ignored by UE if received. |

Paging discontinuous reception (DRX) is defined where the UE in RRC_IDLE or RRC_INACTIVE state is only required to monitor paging channels during one paging occasion (PO) per DRX cycle, while the UE in RRC_CONNECTED state monitors the paging channels in any PO signaled in system information for system information (SI) change indication and public warning system (PWS) notification.

The RedCap UEs may support 20 MHz maximum bandwidth at least for initial access, such that the RedCap UEs may access the cell with full backward compatibility, i.e., with 20 MHz maximum bandwidth, the RedCap UEs are able to detect legacy signals to complete the initial access procedure. Therefore, for the RedCap UEs that have 20 MHz bandwidth, the RedCap UEs will perform the following procedures step by step during initial access, which are similar with legacy UEs,
  Detect the legacy SSBs to achieve DL synchronization, obtain the cell ID and obtain the configuration carried in MIB.
  Detect PDCCH for SIB1 in legacy CORESET0 in search space 0 for SIB1 scheduling, which are configured in MIB.
  Detect physical downlink shared channel (PDSCH) for SIB1 based on the scheduling information, obtain the information such as random access channel (RACH) configuration, Paging configuration, etc., Perform Paging procedure if e.g., there is mobile-oriented data.

Perform RACH procedure to finish the initial access procedure. UE will then turn to RRC connected mode.

On the other hand, there are also strong motivations to introduce dedicated initial BWP for RedCap UEs, which include but not limited to, Offloading the traffic (including the common channels, like RACH, Paging) for RedCap UEs to other BWPs to reduce the impact to legacy UEs in terms of e.g., scheduling opportunities, and possible collisions.

Reducing the number of frequency retuning for RedCap UEs for the purpose of e.g., DL sync., RRM, RLM.

SIB1 might update the initial BWP (IBWP) configuration to be different with the IBWP defined by CORESET0. If the IBWP is configured to be higher than RedCap UE max. BW, the RedCap UEs might not able to detect the data signals transmitted in the initial BWP.

It is expected that the initial BWP dedicated for RedCap UEs will be optionally and adaptively configured, and the BS will control the existence and the updates of the initial BWP configuration dedicated for RedCap UEs based on needs, e.g., to enable, disable, or update the configuration based on an assumption of how many RedCap UEs that will access the network.

The initial BWP dedicated for RedCap UEs, if explicitly configured, is deemed to be at least through legacy SIB1 (that is, SIB1 for legacy UEs). Besides dedicated initial BWP, it might be possible that the SIB1 will contain other RedCap dedicated configurations in future. Consequently, from high level, the SIB1 may contain e.g., configurations dedicated for legacy UEs (e.g., legacy initial BWP configuration), configurations dedicated for RedCap UEs (e.g., initial BWP dedicated for RedCap) and configurations shared by the legacy UEs and the RedCap UEs (e.g., SSB configurations). In addition, the RedCap UEs may be different from legacy UEs, such as eMBB and URLLC UEs in terms of e.g., different traffic type with infrequent small data transmission, lower requirement on latency and/or reliability, etc. From these, if using legacy paging scheme for all types of UEs, there may exist some issues as follows:

If the system information dedicated for legacy UEs (or RedCap UEs) is modified, the gNB will page all types of UEs for this, the RedCap UEs (or legacy UEs) will have to perform unnecessary paging reception for system information modification, which will result in higher power consumption.

If the mobile terminated data for legacy UEs (or RedCap UEs) comes to gNB buffer, the gNB will page all types of UEs for this, the RedCap UEs (or legacy UEs) will have to perform unnecessary paging reception, which will result in higher power consumption.

Therefore, a solution for solving the above issues to provide a method for paging dedicated for RedCap UEs is needed.

In the embodiments of the present application, paging dedicated for RedCap UEs is introduced for the purpose of indicating system information modification dedicated for RedCap UEs (e.g., adaptive initial BWP configuration), or for scheduling and transmitting paging messages dedicated for RedCap UEs.

Figure 3:
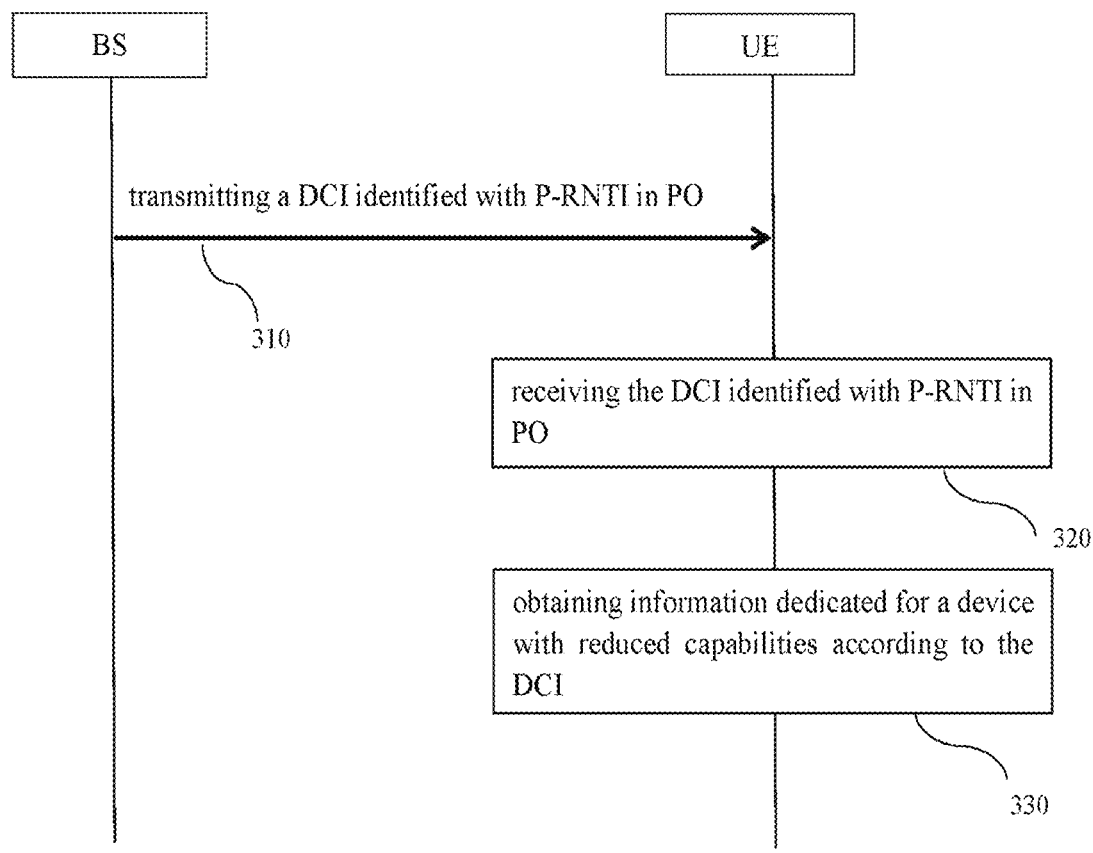
FIG. 3 is a flow diagram illustrating a method for paging dedicated for devices with reduced capabilities according to some embodiments of the present application.

FIG. 3 is a flow diagram illustrating a method for paging dedicated for devices with reduced capabilities according to some embodiments of the present application.

As shown in FIG. 3, in step 310, a BS (e.g., BS 101 in FIG. 1) transmits a DCI identified with a P-RNTI in PO on PDCCH. The DCI may include information associated with information dedicated for a device with reduced capabilities. The P-RNTI is used to identify a group of UEs in a paging message. In an example, the P-RNTI may be a legacy P-RNTI, the legacy P-RNTI may indicates the P-RNTI for both legacy UEs and RedCap UEs, which means that the legacy P-RNTI does not distinguish between the legacy UEs and the RedCap UEs. In another example, the P-RNTI may be a new P-RNTI, which is dedicated for the RedCap UEs.

In step 320, a UE (that is, a RedCap UE, e.g., UE 103b in FIG. 1) detects and receives the DCI identified with the P-RNTI in a target PO. The DCI may include at least one of a short message indicator dedicated for the RedCap UE, a short message dedicated for the RedCap UE, and scheduling information for a paging message dedicated for the RedCap UE.

In step 330, the UE may obtain information dedicated for a RedCap UE according to the DCI. The information dedicated for the RedCap UE may include at least one of: the short message indicator dedicated for the RedCap UE; the short message dedicated for the RedCap UE; the scheduling information for a paging message dedicated for the RedCap UE; and a paging message dedicated for the RedCap UE.

The method for paging dedicated for devices with reduced capabilities in FIG. 3 will be described in detail in conjunction with the detail embodiments of the present application.

In an embodiment of the present application, the short message indicator dedicated for RedCap UEs is introduced.

After receiving the DCI (e.g., DCI format 1_0) on PDCCH in step 320, a RedCap UE will detect the DCI with legacy P-RNTI in the target PO. The DCI may include a short message indicator and a short message. The short message indicator may indicate one of three kinds of indication information: only scheduling information for paging for RedCap UEs is present in the DCI, only short message dedicated for RedCap UEs is present in the DCI, and both scheduling information for paging and short message dedicated for RedCap UEs are present in the DCI. The information is indicated using reserved bits in the short message indicator defined in Table 1. Table 3a, Table 3b, and Table 3c give examples on indicating each of the three kind of information using the reserved bits, i.e., bit 00.

TABLE 3a

| Bit | Short Message indicator |
|---|---|
| 00 | Only scheduling information for paging for RedCap UEs is present in the DCI |
| 01 | Only scheduling information for Paging is present in the DCI |
| 10 | Only Short Message is present in the DCI |
| 11 | Both scheduling information for Paging and Short Message are present in the DCI |

TABLE 3b

| Bit | Short Message indicator |
|---|---|
| 00 | Only Short Message for RedCap UEs is present in the DCI |
| 01 | Only scheduling information for Paging is present in the DCI |
| 10 | Only Short Message is present in the DCI |
| 11 | Both scheduling information for Paging and Short Message are present in the DCI |

TABLE 3c

| Bit | Short Message indicator |
|---|---|
| 00 | Both scheduling information for Paging and Short Message for RedCap UEs are present in the DCI |
| 01 | Only scheduling information for Paging is present in the DCI |
| 10 | Only Short Message is present in the DCI |
| 11 | Both scheduling information for Paging and Short Message are present in the DCI |

In an embodiment of the present application, a short message dedicated for RedCap UEs is introduced.

After receiving the DCI (e.g., DCI format 1_0) on PDCCH in step 320, a RedCap UE will detect the DCI with legacy P-RNTI in the target PO. The DCI may include a short message indicator and a short message. For example, the short message indicator may be a short message indicator for legacy UEs as shown in Table 1.

The short message indicator may indicate that a short message is present in the DCI (corresponding to bit 11 or bit 10 in the Table 1). In this embodiment, the short message is a short message dedicated for the RedCap UE. For example, the short message dedicated for the RedCap UE may be indicated using reserved bits in the short message for legacy UEs. In an example, the short message may indicate system information modification dedicated for RedCap UEs. Table 4 gives an example for the short message dedicated for the RedCap UE, where a new indicator named as systemInfoModificationRedCap is introduced for RedCap UEs. The indicator is corresponding to the fourth bit of short message, which is not used for legacy UEs.

TABLE 4

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for Paging in this PO. |
| 4 | systemInfoModificationRedCap<br>If set to 1: indication of a BCCH modification other than SIB6, SIB7 and SIB8 for RedCap UEs. |
| 5-8 | Not used in this release of the specification, and shall be ignored by UE if received. |

In this example, the short message indicates a system information modification dedicated for RedCap UEs, thus the RedCap UE may detect the system information blocks (SIBs) to update the system information. In an example, the system information modification dedicated for RedCap UEs may include activation or deactivation of configurations dedicated for RedCap UEs. In this example, the configurations dedicated for RedCap UEs may be configured to the RedCap UEs, but whether they are effective or not is controlled by an activation or deactivation indicator. A short message dedicated for RedCap UEs may activate the configurations if they are currently deactivated or deactivate the configurations if they are currently activated. In one example, a short message dedicated for RedCap UEs may activate or deactivate the initial BWP configurations dedicated for RedCap UEs. In another example, a short message dedicated for RedCap UEs may activate or deactivate the SSB configurations dedicated for RedCap UEs. In another example, the system information modification dedicated for RedCap UEs may include initial BWP configuration update for RedCap UEs. The RedCap UE may receive paging message to obtain the initial BWP configuration update dedicated for RedCap UEs according to the scheduling information in the DCI. As a result, any system information modification for RedCap UEs will not impact legacy UEs behavior. In another example, the RedCap UE may receive paging to obtain the SSB configuration dedicated for RedCap UEs according to the scheduling information in the DCI.

In addition, the short message may be another RedCap dedicated short message, e.g., short message for stopPagingMonitoring dedicated for RedCap UEs. Table 5 gives another example for the short message dedicated for the RedCap UE, where a new indicator named as stopPagingMonitoringRedCap is introduced for RedCap UEs. The indicator is corresponding to the fourth bit of short message.

TABLE 5

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for Paging in this PO. |
| 4 | stopPagingMonitoringRedCap<br>If set to 1: stop monitoring PDCCH occasions(s) for Paging in this PO for RedCap UEs. |
| 5-8 | Not used in this release of the specification, and shall be ignored by UE if received. |

In another embodiment of the present application, a DCI dedicated for RedCap UEs, which is identified by a new P-RNTI dedicated for the RedCap UE is introduced.

The DCI identified with the new P-RNTI is a scheduling DCI for addressing short message and paging message dedicated for the RedCap UE. In an example, the new P-RNTI dedicated for the RedCap UE may be predefined. In another example, the new P-RNTI dedicated for the RedCap UE may be configured in SIB1. The DCI dedicated for RedCap UEs may have same size with the DCI for legacy UEs in order to reduce the blind decoding effort. The short message dedicated for the RedCap UE may be the short message as shown in above Table 2, Table 4 or Table 5.

In this embodiment, if receiving a DCI with a legacy P-RNTI from a BS, the RedCap UE may determine whether it needs to detect the DCI with the legacy P-RNTI based on configuration, such as in SIB1.

In an example, after receiving a DCI (e.g., DCI format 1_0) dedicated for RedCap UEs on PDCCH in step 320, a RedCap UE will detect the DCI with the new P-RNTI dedicated for RedCap UEs. The DCI may include a short message indicator, a short message and/or scheduling information for paging message.

In one case, the short message indicator in the DCI indicates that a short message is present in the DCI dedicated for RedCap UEs, and the short message in the DCI indicates a system information modification. In an example, the system information modification may be about enabling, disabling, or updating of initial BWP configurations dedicated for the RedCap UEs in SIB(s). Thus the RedCap UE will detect the corresponding SIB(s) from a BS to obtain the corresponding system information modification. For example, the RedCap UE may receive SIB1 from a BS to obtain the system information modification, such as initial BWP configurations update for the RedCap UE. The RedCap UE may also receive other SIBs from a BS to obtain other system information modification. In another example, the system information modification may be about enabling, disabling, or updating of SSB configurations dedicated for the RedCap UEs in SIB(s). Thus the RedCap UE will detect the corresponding SIB(s) to obtain the SSB configurations update.

In another case, the short message indicator indicates scheduling information for paging message is present in the DCI dedicated for RedCap UEs, the RedCap UE will detect and receive the paging message from a BS according to the scheduling information in the DCI.

In yet another embodiment of the present application, a paging message dedicated for RedCap UEs for system information modification for RedCap UEs, which is scheduled by a DCI identified by a new P-RNTI.

In an example, the paging message dedicated for RedCap UEs may carry the system information modification dedicated for the RedCap UEs, such as, the information regarding enabling, disabling, or updating of the initial BWP configurations dedicated for the RedCap UEs. In another example, the paging message dedicated for RedCap UEs may carry the SSB configurations dedicated for RedCap UEs, such as, information on enabling, disabling, or updating of SSB configurations dedicated for RedCap UEs.

Similar with the previous embodiment, the DCI identified with the new P-RNTI is a scheduling DCI for addressing short message and paging message dedicated for the RedCap UE. In an example, the new P-RNTI dedicated for the RedCap UE may be predefined. In another example, the new P-RNTI dedicated for the RedCap UE may be configured in SIB1. The DCI dedicated for RedCap UEs may have same size with the DCI for legacy UEs in order to reduce the blind decoding effort. The short message dedicated for the RedCap UE may be the short message as shown in above Table 2, Table 4 or Table 5.

In an example, after receiving a DCI (e.g., DCI format 1_0) dedicated for RedCap UEs on PDCCH in step 320, a RedCap UE will detect the DCI with the new P-RNTI dedicated for RedCap UEs. The DCI may include a short message indicator, a short message and scheduling information for paging message.

In an example, the short message indicator indicates scheduling information for paging message is present in the DCI dedicated for RedCap UEs, the RedCap UE will detect the paging message from a BS according to the scheduling information in the DCI, and thus the RedCap UE may receive the paging message including the information regarding the system information modification for the RedCap UEs or the information regarding the SSB configurations dedicated for RedCap UEs. In an example, the system information modification may be about initial BWP configurations dedicated for the RedCap UEs, such as, enabling, disabling, or updating of initial BWP dedicated for the RedCap UEs. In another example, the system information modification may be about SSB configurations dedicated for the RedCap UEs, such as, enabling, disabling, or updating of SSB configurations dedicated for the RedCap UEs.

In the embodiments of the present application, the above mentioned POs (or called default POs) for RedCap UEs may be configured from the two options. The first option is that the default POs are configured completely separated from the legacy default POs (that is, the default POs for legacy UEs). The second option is that the default POs are configured as a subset of legacy default PO.

Figure 4:
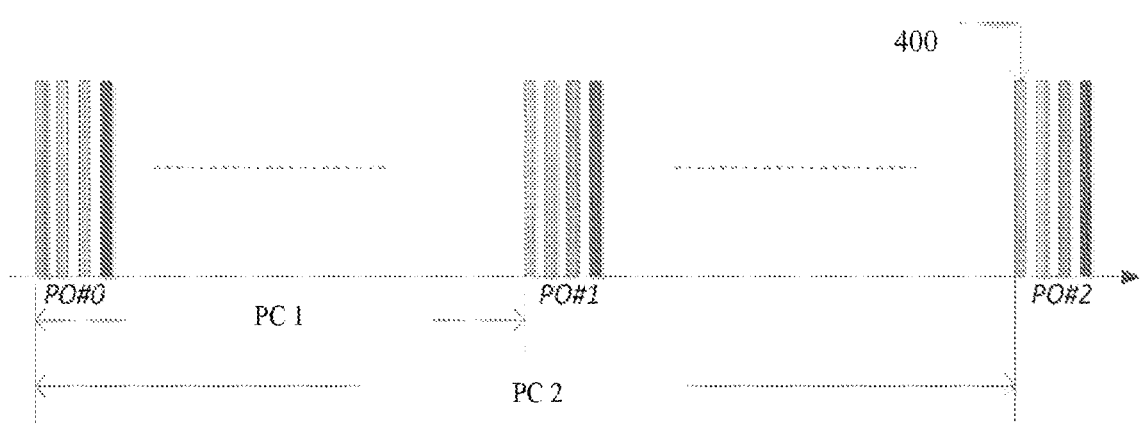
FIG. 4 illustrates an example for the PO configurations.

FIG. 4 illustrates an example of the PO configurations for the second option.

As shown in FIG. 4, it shows three POs, which are PO #0, PO #1, and PO #2. Each PO has 4 PDCCH monitoring occasions, and one occasion for each beam. For example, reference number 400 indicates one PDCCH monitoring occasion for a specific beam. PC1 represents a paging cycle for legacy UEs, and PC2 represents a paging cycle for RedCap UEs.

For the case as shown in FIG. 4, in PO #0 and PO #2, the UE (a legacy UE or a RedCap UE) may receive both the DCI with legacy P-RNTI and the DCI with the new P-RNTI dedicated for the RedCap UEs, PO #1 is only for legacy P-RNTI. In an example, when the RedCap UE detects a DCI with new P-RNTI dedicated for the RedCap UEs, it will omit the legacy DCI, if the legacy DCI exists. If the RedCap UE only detects the DCI with legacy P-RNTI, the RedCap UE may follow the paging procedure for legacy UEs to receive short message or paging message.

In the above embodiments, the same initial BWP is allocated to all RedCap UEs, for example, the information regarding enabling, disabling, or updating of the initial BWP configurations dedicated for RedCap UEs may be carried in the paging message and be received by the RedCap UE.

Alternatively, in another embodiment of the present application, for RRC connected RedCap UEs, the common part of the initial BWP configuration or the information regarding an update of the common part of the initial BWP configuration may be received by a certain RedCap UE in a device specific signaling, such as a UE specific RRC signaling. Similarly, the SSB configuration dedicated for RedCap UEs or an update of SSB configuration dedicated for RedCap UEs may be also received by a certain RedCap UE in a device specific signaling, such as a UE specific RRC signaling. Therefore, instead of allocating the same initial BWP to all the RedCap UEs, initial BWP switching for RedCap UEs may be performed in a more flexible way.

Furthermore, a BS may configure a plurality of initial BWPs dedicated for RedCap UEs (such as in SIB1), and which initial BWP the RedCap UE may select to camp on is based on at least one of UE type and UE ID. The UE type may include, e.g. high-end RedCap UE and low-end RedCap UE. As an example, if there are K initial BWPs configured, the UE will camp the initial BWP n with mod(n, K)=0, where is mod( ) is a modulo operation.

The following will describe the initial BWP switching for RedCap UEs in detail with respect to the RedCap UE in different state or mode.

For a RedCap UE that is powered on and accessing the network, when receiving SIB1 which configures an initial BWP dedicated for RedCap UEs, the RedCap UE will switch to the configured initial BWP dedicated for RedCap UEs and continue the RACH procedure and paging procedure.

For a RedCap UE that is either in RRC_IDLE mode or RRC_CONNECTED mode (or state), if the UE is now camping on an initial BWP and is configured with a new initial BWP through the above described embodiments, the UE will switch to the configured new initial BWP.

For a RedCap UE which is in an active BWP other than the initial BWP and is configured with a new initial BWP through the above described embodiments, the UE will switch to the configured new initial BWP when initiating a random access procedure, if there is no RACH configurations in this active BWP.

For a RedCap UE which is in an active BWP, and is configured with a BWP inactive timer, if the UE is configured with a new initial BWP through the above described embodiments, the UE will switch to the configured new initial BWP upon the BWP inactivity timer expires. In an example, the BWP inactivity timer is configured for the initial BWP dedicated for RedCap UE, and upon the timer expires, the UE switches to initial BWP for legacy UEs.

After performing the initial BWP switching for RedCap UEs, the previous initial BWP is released or deactivated by the RedCap UE.

Therefore, the above described embodiments can provide a method for paging dedicated for devices with reduced capabilities and realize initial BWP switching for devices with reduced capabilities.

Figure 5:
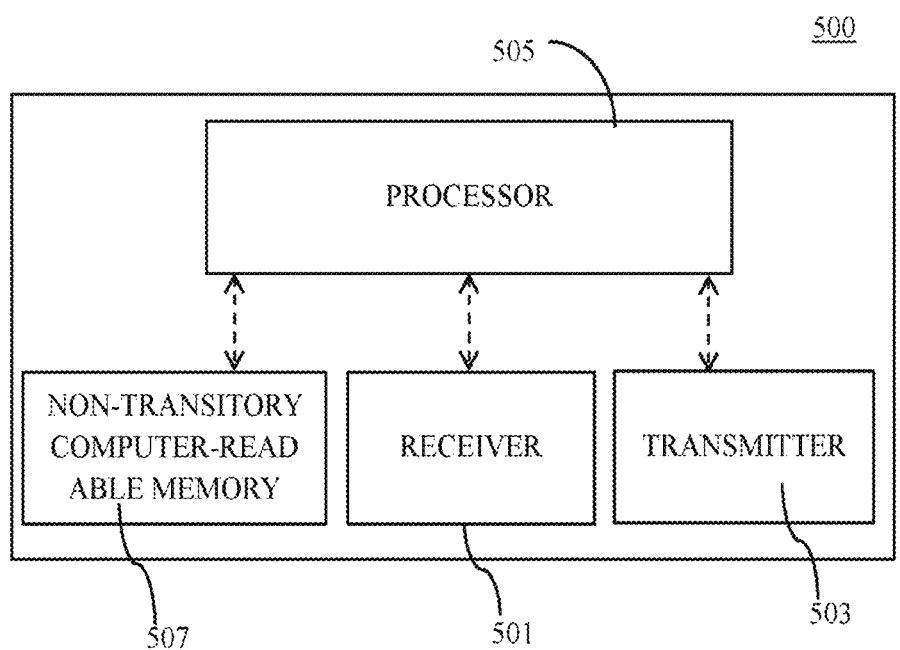
FIG. 5 illustrates an apparatus according to some embodiments of the present application.

FIG. 5 illustrates an apparatus according to some embodiments of the present application. In some embodiments of the present disclosure, the apparatus 500 may be a UE 103 as illustrated in FIG. 1 or other embodiments of the present application.

As shown in FIG. 5, the apparatus 500 may include a receiver 501, a transmitter 503, a processor 505, and a non-transitory computer-readable medium 507. The non-transitory computer-readable medium 507 has computer executable instructions stored therein. The processor 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the method according to embodiments of the present application.

Figure 6:
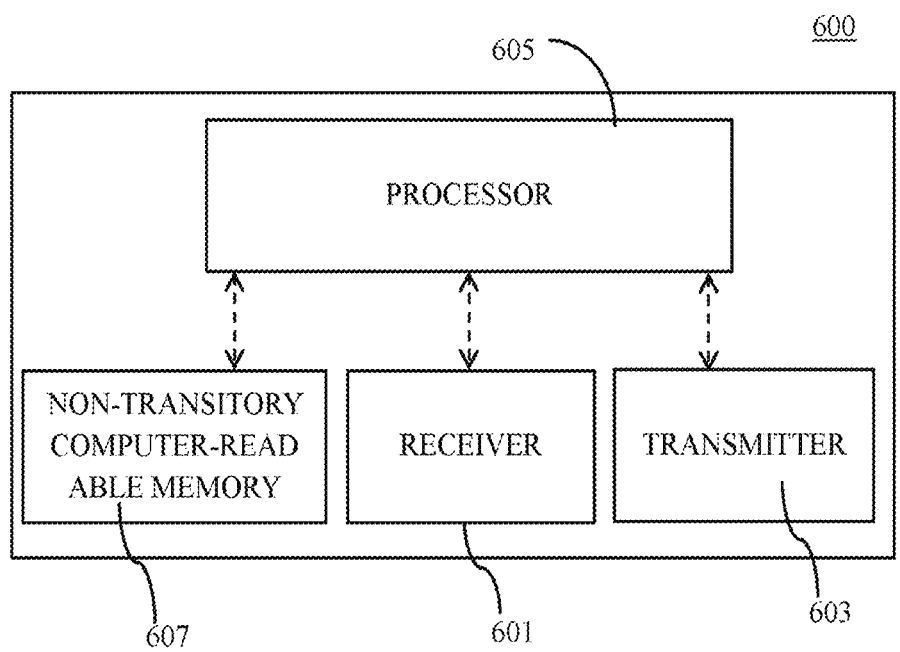
FIG. 6 illustrates an apparatus according to some embodiments of the present application.

FIG. 6 illustrates an apparatus according to some embodiments of the present application. In some embodiments of the present disclosure, the apparatus 600 may be a BS 101 as illustrated in FIG. 1 or other embodiments of the present application.

As shown in FIG. 6, the apparatus 600 may include a receiver 601, a transmitter 603, a processor 606, and a non-transitory computer-readable medium 607. The non-transitory computer-readable medium 607 has computer executable instructions stored therein. The processor 606 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
   at least one memory; and
   at least one processor coupled with the at least one memory and operable to cause the UE to:
      receive a downlink control information (DCI) identified with a paging-radio network temporary identifier (P-RNTI) in a paging occasion (PO); and
      obtain information for a device with reduced capabilities according to the DCI identified with the P-RNTI, the information configured to cause the UE to obtain an initial bandwidth part (IBWP) configuration update for the device with reduced capabilities.

2. The UE of claim 1, wherein the information for the device with reduced capabilities comprises at least one of:
   a short message indicator for the device with reduced capabilities;
   a short message for the device with reduced capabilities;
   scheduling information for a paging message for the device with reduced capabilities; or
   a paging message for the device with reduced capabilities.

3. The UE of claim 2, wherein the short message indicator for the device with reduced capabilities comprises indication information of one or more of:
- scheduling information for paging for the device with reduced capabilities is present in the DCI;
- short message for the device with reduced capabilities is present in the DCI; or
- both scheduling information for paging and short message for the device with reduced capabilities are present in the DCI, and wherein the short message indicator for the device with reduced capabilities is indicated using reserved bits in the short message indicator for legacy devices.

4. The UE of claim 2, wherein the short message for the device with reduced capabilities is indicated using reserved bits in the short message for legacy devices, and wherein the short message for the device with reduced capabilities comprises at least one of:
- indication information on system information modification for the device with reduced capabilities; or
- indication information on stop paging monitoring for the device with reduced capabilities.

5. The UE of claim 4, wherein the PO is for the device with reduced capabilities and the system information modification for the device with reduced capabilities comprises: activation or deactivation of configurations for the device with reduced capabilities.

6. The UE of claim 4, wherein the system information modification for the device with reduced capabilities comprises the IBWP configuration update for the device with reduced capabilities, and wherein the at least one processor is operable to cause the UE to receive the paging message to obtain the IBWP configuration update for the device with reduced capabilities according to the scheduling information for the paging message.

7. The UE of claim 2, wherein:
- the DCI is a scheduling DCI for the short message and the paging message for the device with reduced capabilities, which is addressed by P-RNTI that is for the device with reduced capabilities;
- the P-RNTI is one or more of predefined or configured in system information block 1 (SIB1); and
- the at least one processor is operable to cause the UE to receive SIB1 to obtain system information modification for the device with reduced capabilities.

8. The UE of claim 7, wherein the at least one processor is operable to cause the UE to:
- receive the paging message for the device with reduced capabilities according to the scheduling information in the scheduling DCI with the P-RNTI for the device with reduced capabilities, wherein the paging message for the device with reduced capabilities comprises system information modification for the device with reduced capabilities.

9. The UE of claim 8, wherein the system information modification comprises: information on enabling, disabling, or updating of IBWP for the device with reduced capabilities in system information block.

10. The UE of claim 8, wherein the system information modification comprises: information on enabling, disabling, or updating of synchronization signal block (SSB) configurations for the device with reduced capabilities.

11. The UE of claim 1, wherein the at least one processor is operable to cause the UE to perform one or more of to:
- receive an update of a common part of IBWP configuration in a device specific signaling;
- receive an update of SSB configuration in a device specific signaling;
- select one IBWP from a plurality of IBWPs based on at least one of a device type and a device ID; or
- receive the common part of IBWP in a device specific signaling.

12. The UE of claim 1, wherein the at least one processor is operable to cause the UE to:
- receive a configuration indicating an IBWP for the device with reduced capabilities; and
- switch to the IBWP for the device with reduced capabilities.

13. The UE of claim 12, wherein to switch to the IBWP for the device with reduced capabilities, the at least one processor is operable to cause the UE to:
- switch to the IBWP for the device with reduced capabilities when a timer expires.

14. The UE of claim 12, wherein the at least one processor is operable to cause the UE to:
- start a timer when the device with reduced capabilities is on the IBWP for the device with reduced capabilities; and
- switch to a second IBWP when the timer expires.

15. A network entity for wireless communication, comprising:
- at least one memory; and
- at least one processor coupled with the at least one memory and operable to cause the network entity to:
  - transmit a downlink control information (DCI) identified with a paging-radio network temporary identifier (P-RNTI) in a paging occasion (PO), wherein the DCI comprises information for a device with reduced capabilities, the information comprising initial bandwidth part (IBWP) configuration update for the device with reduced capabilities.

16. The network entity of claim 15, wherein the information for the device with reduced capabilities comprises at least one of:
- a short message indicator for the device with reduced capabilities;
- a short message for the device with reduced capabilities;
- scheduling information for a paging message for the device with reduced capabilities; or
- a paging message for the device with reduced capabilities.

17. The network entity of claim 16, wherein the short message indicator for the device with reduced capabilities comprises indication information of one or more of:
- scheduling information for paging for the device with reduced capabilities is present in the DCI;
- short message for the device with reduced capabilities is present in the DCI; or
- both scheduling information for paging and short message for the device with reduced capabilities are present in the DCI.

18. The network entity of claim 16, wherein the short message for the device with reduced capabilities comprises at least one of:
- indication information on system information modification for the device with reduced capabilities; or
- indication information on stop paging monitoring for the device with reduced capabilities.

19. The network entity of claim 16, wherein:
- the DCI is a scheduling DCI for the paging message for the device with reduced capabilities, which is addressed by P-RNTI that is for the device with reduced capabilities;

the at least one processor is operable to cause the network entity to transmit the paging message for the device with reduced capabilities according to the scheduling information in the scheduling DCI with the P-RNTI for the device with reduced capabilities;

the paging message for the device with reduced capabilities comprises system information modification for the device with reduced capabilities; and the system information modification comprises information on enabling, disabling, or updating IBWP for the device with reduced capabilities in a system information block.

20. A method performed by a user equipment (UE), the method comprising:

receiving a downlink control information (DCI) identified with a paging-radio network temporary identifier (P-RNTI) in a paging occasion (PO); and obtaining information for a device with reduced capabilities according to the DCI identified with the P-RNTI, the information causing the UE to obtain initial bandwidth part (IBWP) configuration update for the device with reduced capabilities.

* * * * *